United States Patent

Malcolm et al.

[15] 3,698,007

[45] Oct. 10, 1972

[54] CENTRAL PROCESSOR UNIT HAVING SIMULATIVE INTERPRETATION CAPABILITY

[72] Inventors: Ronald D. Malcolm, Marlborough; William J. Phelan, North Reading; Thomas L. Sangiolo, Hudson, all of Mass.

[73] Assignee: Honeywell Inc., Minneapolis, Minn.

[22] Filed: Nov. 30, 1970

[21] Appl. No.: 93,901

Related U.S. Application Data

[63] Continuation of Ser. No. 662,699, Aug. 23, 1967.

[52] U.S. Cl. ....................................444/1, 340/172.5

[51] Int. Cl. ................................................G05b 19/18

[58] Field of Search ........................340/172.5; 444/1

[56] References Cited

UNITED STATES PATENTS

| | | | |
|---|---|---|---|
| 3,374,466 | 3/1968 | Hanf et al. | 340/172.5 |
| 3,543,245 | 11/1970 | Nutter | 340/172.5 |
| 3,544,969 | 12/1970 | Rakoczi et al. | 340/172.5 |

*Primary Examiner*—Paul J. Henon
*Assistant Examiner*—Paul R. Woods
*Attorney*—Ronald T. Reiling

[57] ABSTRACT

An electronic digital computer provides real time simulation of the operation of a different digital computer with a minimal amount of special interpretive software. The central processor of the simulating computer develops and stores in one register the memory address of the operands processed by the program being interpreted. In another register, the simulating processor develops and stores the memory address of an interpretive subroutine for each instruction of the program being interpreted. The simulating computer in addition operates a third central processor register as an effective program counter during execution of simulative interpretation. A fourth register is used to supply the memory sector portion of the memory addresses developed above. Each of the four registers is directly accessible by other elements of the central processor.

6 Claims, 9 Drawing Figures

INVENTORS
RONALD D. MALCOLM
WILLIAM J. PHELAN
THOMAS L. SANGIOLO
BY W. Hugo Liepmann
ATTORNEY

*INVENTORS*
RONALD D. MALCOLM
WILLIAM J. PHELAN
THOMAS L. SANGIOLO
BY W. Hugo Liepmann
ATTORNEY

AFTER FETCH OF LAST SUBROUTINE INSTRUCTION (FIG. 3F, FIG. 3G)

| TIME | BEFORE CYCLE 1 | AFTER CYCLE 1 | AFTER CYCLE 2 | AFTER CYCLE 3 | AFTER CYCLE 4 | | AFTER CYCLE 1 |
|---|---|---|---|---|---|---|---|
| L | 30,20 | 30,20 | 30,20 | 30,20 | 30,20 | 30,20 | 30,20 |
| M | NOT RELEVANT | NOT RELEVANT | 30100 | 30100 | 30100 | 30100 | NOT RELEVANT |
| N | 25700 | 25701 | 25701 | 25701 | 25701 | 25701 | 25702 |
| PC | NOT RELEVANT | NOT RELEVANT | NOT RELEVANT | 20080 | 20081 | 20087 | NOT RELEVANT |
| Z | JIN INST | Ld Ac 100 (S-WORD) | Ld Ac 100 (S-WORD) | Ld Ac 100 (S-WORD) | LDA,M INST | JIN INST | Add 200 |
| OP-CODE | JIN, N | JIN, N | JIN, N | JIN, N | LDA, M | JIN,N | JIN,N |
| | FIG. 3A | FIG. 3B | FIG. 3C | FIG. 3D | FIG. 3E | FIG. 3F | FIG. 3G |

INVENTORS
RONALD D. MALCOLM
WILLIAM J. PHELAN
THOMAS L. SANGIOLO
BY W. Hugo Liepmann
ATTORNEY

CENTRAL PROCESSOR UNIT HAVING SIMULATIVE INTERPRETATION CAPABILITY

This is a continuation of the copending application Ser. No. 662,699, filed Aug. 23, 1967.

BACKGROUND

This invention relates to the arrangement of the central processor unit of an electronic digital computer to simulate the operation of a different computer, herein referred to as a source computer. In particular, the invention provides a central processor unit that executes instructions written for other different computers with relatively little special interpretive programming and in real time. By "real time" it is meant that the central processor executes instructions written for the source computer in such a brief time that the results are available to steer (i.e. modify or otherwise control) the process or system producing the data being processed to maintain the process or system within given constraints.

In the prior art, simulation of a source computer on another computer has been done by using separate translating programs to convert the source computer program to a program the simulating computer can process. The expenditure of excessive skilled programming labor in preparing the translator program and the commitment of considerable memory capacity required to store the translated program are disadvantages of this approach to such simulation. Further, the computer time consumed in performing the translation is considerable and the problem of distinguishing between instructions and operands (data) sometimes makes translation exceedingly difficult.

According to another prior simulation procedure, the simulating computer employs a special interpretive program to translate the source program into instructions the simulating computer can execute. Although simulation can be done in this manner with a general purpose computer, the procedure is generally slow due to the many steps required to decode and then execute each source-program instruction.

Accordingly, it is an object of this invention to provide an improved electronic digital processor unit capable of simulating the operation of other different computers.

Another object of the invention is to provide a digital computer capable of real time simulation of other computers. In particular, it is an object to provide a general purpose digital computer having such capability. A further object is that the simulating computer require relatively little special interpretive programming. Also, the simulating computer should be capable of simulating another computer substantially without regard to the manner in which the other computer is programmed.

Other objects of the invention will in part be obvious and will in part appear hereinafter.

The invention accordingly comprises the features of instruction, combination of elements and arrangement of parts exemplified in the construction hereinafter set forth, and the scope of the invention is indicated in the claims.

SUMMARY OF THE INVENTION

The central processor unit of an electronic digital computer embodying the invention has three registers directly accessible by other elements of the processor unit. These registers and the processor control circuits are constructed and arranged to provide the following operation.

When the central processor receives an instruction specifying that an instruction of the source (S) program is to be executed, the processor transfers its program counter control to a first of these registers. Specifically, the central processor uses the contents of one register to develop the memory address of the S instruction to be performed. The central processor then increments this register, just as it would normally increment its regular program computer.

After the S instruction thus addressed is fetched from the computer memory unit, the central processor control circuits cause the address of the operand for use in executing that instruction to be developed. This is done by combining the address field bits of the newly fetched S instruction with memory sector bits stored in another of the three registers.

In addition, the processor control circuits develop the memory address of the first instruction in an interpretive subroutine with which the processor will perform the actions specified by the S instruction. This subroutine address is formed by combining the operation code bits of the new fetched S instruction with other previously-stored memory sector bits.

This arrangement of the central processor unit of the simulating computer enables it to locate and perform the subroutine for executing an instruction in a different, source language with comparitively few operations and hence in short time. In fact, a general purpose computer arranged in this manner has simulated a real time process-controlling computer with less operating time than the source computer itself requires.

BRIEF DESCRIPTION OF DRAWINGS

For a fuller understanding of the nature and objects of the invention, reference should be had to the following detailed description taken in connection with the accompanying drawings in which:

FIG. 3A–3G is a chart of the contents of several elements of the FIG. 1 computer during the operation shown in FIG. 2

DESCRIPTION OF PREFERRED EMBODIMENT

Figure 1:
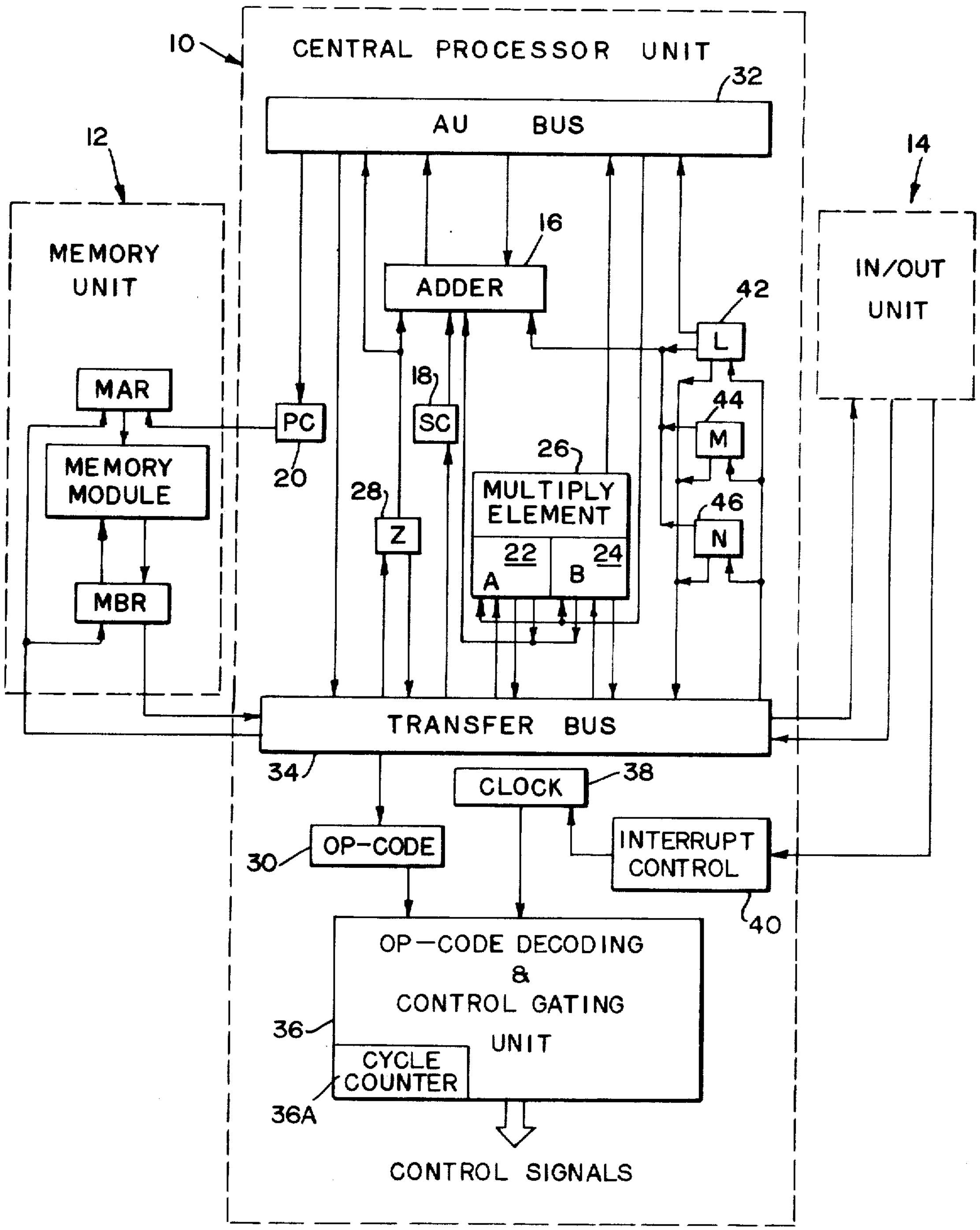
FIG. 1 is a schematic block representation of a general purpose electronic digital computer embodying the invention.

FIG. 1 shows an electronic digital computer having a central processor unit 10 connected with a conventional memory unit 12 and a conventional in/out unit 14. The central processor unit 10, illustrated as suitable for general purpose application, may be similar to that disclosed in a patent issued to H. W. Schrimpf on Aug. 17, 1965 and numbered U.S. Pat. No. 3,201,762 has, as is conventional, a binary adder 16, a shift counter 18, and a program counter 20. In addition, it has two arithmetic registers 22 and 24 respectively designated an A register and a B register, and a multiplying element 26 that embraces the adding, decoding, and gating circuits for performing multiply operations. A Z register 28 is arranged to receive words read into the memory buffer register (MBR) of the memory unit 12. In addition, selected bits of each word fetched from memory, similar to that shown in U.S. Pat. No. 3,134,967 generally the operation code and index code bits, are normally loaded directly into an op-code register 30.

As also shown, the central processor unit 10 is arranged with an arithmetic unit (AU) bus 32 and a transfer bus 34. Each bus is, in effect, a gating structure to which the processor unit elements are connected, generally both as a source and as a destination. Transfer of information from one processor element to another takes place by the simultaneous gating of the signal paths from the first element to one bus and from that bus to the other element. This gating, and the other processor operations such as increment, clear, set, and the like, are performed with control signals furnished by an op-code decoding and control gating unit 36, similar to that found in a patent issued to J. J. Eachus, entitled "Control Signal Generator For A Computer Apparatus" and numbered U.S. Pat. No. 3,345,611.

The input signals for the decoding and gating unit 36 are timing pulses produced with a control clock 38 (similar to that found in U.S. Pat. No. 3,214,695, by B. K. Betz entitled "Timing Pulse Circuit Employing Cascaded Gated Monostables Sequenced And Controlled By Counter") and the operation code and index code bits stored in the op-code register 30. Processor interrupts required by in/out elements are initiated with signals applied from the in/out unit 14 to an interrupt control 40 that connects to the control clock 38.

The above-mentioned references further describe all the conventional elements of FIG. 1. For example, the Ringer patent describes a typical clock unit similar to clock 38 on FIG. 1. The above referenced Eachus U.S. Pat. No. 3,345,611 describes a typical controller similar to the control gating unit represented by block 36 and "has built therein certain basic logic representing individual steps which can be readily combined to form orders of any desired complexity. The flexibility is achieved by a unique arrangement of the computer logic with a computer sequencer which is adapted to provide gating and control signals for combining the individual logic functions into a predetermined order structure in accordance with the logic established within the sequencer.—The sequencer used in the present apparatus is of the type which is capable of automatically stepping through a series of program steps once a particular control combination has been established within the sequencer." (Column 1, lines 30–60) An op-code decoding apparatus is shown on FIG. 41*a* in the above referenced Schrimpf patent and described in column 76, lines 35–50. Also shown in the above-referenced Schrimpf patent is a cycle counter illustrative of a type which may be used with minor modifications in the block of 36*a;* this cycle counter is shown in FIGS. 43*a* to 43*h* in the Schrimpf patent and described in column 79, lines 10–75, column 80, lines 1–75, column 81, lines 1–75, and column 82, lines 1–41. Also shown and described in the above Schrimpf patent is a program counter (FIG. 40, 40A, 40B column 75, lines 18–45.) The Schrimpf patent further shows a complete operative computer embodying most of the conventional elements shown in FIG. 1 which according to the instant disclosure can be used to simulate interpretively another computer having a different language, different size words, etc.

The central processor unit 10 also has an L register 42, an M register 44, and an N register 46. Each of these registers is directly accessible in both directions with regard to the transfer bus 34. In addition, the L register can apply information directly to the AU bus 32. (Registers are conventional and may be comprised of flip-flops or magnetic cores.)

As indicated above, the decoding and gating unit 36 is constructed to provide, with the other central processor unit elements, a special sequence of operations when the op-code register 30 stores a JIN (Jump Interpretive) operation code, i.e. an operation code calling for execution of an instruction from the source program. To better understand the following discussion, reference should be made to a book entitled "-Digital Computer Fundamentals" by Thomas C. Bartee and published by McGraw Hill Book Company Inc., 1960, which describes a prior art control unit on pages 305 to 331 and more particularly pages 306 through 315. By referring to FIGS. 9–3, 9–4 and 9–5 of the above referenced book one can see how a similar unit can be adapted to provide the particular sequence of signals representative of the sequence of operations and signals described infra. The construction of the unit 36 of FIG. 1 of the instant application for this operation will now be described further with reference to an illustrative example. Logic block diagrams of Op-Code Decoding and Control Gating Unit 36 as shown in the System Manual entitled "APOLLO GUIDANCE COMPUTER SIMULATOR/LEM GUIDANCE COMPUTER SIMULATOR (ASGC/LSGC)," Volume II Copyright 1967 by Honeywell Inc. Computer Control Div. Framingham, Mass. The Boolean expressions for this unit, to be used with appropriate AND, NAND, or NOR gates, etc., are to be found on pages 4–37 through 4–47 of SYSTEM MANUAL APOLLO GUIDANCE COMPUTER SIMULATOR/LEM GUIDANCE COMPUTER SIMULATOR (ASGC/LSGC) Volume I, Copyright 1967 by Honeywell Inc. Computer Control Division, Framingham, Mass. In this example, it is assumed that the computer of FIG. 1 is arranged to process 24-bit words and that the S computer operates on 15-bit words. Hence, S program words are often hereinbelow stored in the 15 lower order stages, i.e. stages 10 – 24, of a FIG. 1 computer element.

Prior to the actual simulative interpretation of the source computer, the FIG. 1 computer is readied in the following manner. The interpretive subroutines, i.e. the groups of one or more instructions with which the FIG. 1 computer performs each instruction in the S program are stored in the memory unit 12 in a sector of the memory module having, for example, the sector address (20). (All memory addresses specified herein are decimal numbers unless otherwise designated and are enclosed in parentheses). In addition, this sector address (20) is stored, again by way of illustration, in the L register 42 stages 18 – 24 for direct subsequent transfer to the program counter 20.

A further preparatory step is to load the N register 46 with the starting address of the S program stored in the memory unit 12. Assume, for example, that this address is (25000). In addition, the L register 42 stages 10 – 14 are loaded with the beginning sector address of the S program operands, i.e. with the memory sector where the first operand for the S program is stored, for example (30). This sector address may be changed during the simulation, the change being under control of the S program just as that program would change the sector register of the source computer.

With the computer of FIG. 1 readied in the foregoing manner, it commences simulative interpretation of the source computer when a JIN instruction is fetched and loaded into the Z register 28 and the operation code and index bits of the JIN instruction are loaded in the op-code register 30. The index bits of the instruction identify the N register 46 to specify that the address of the S instruction to be interpreted is in the N register.

At this juncture, the contents of the central processor unit 10 registers L, M, N, Z and op-code and of the program counter are set forth in FIG. 3A. That is, the L register contains the two sector addresses (30) and (20) (the former in stages 10 – 14 and the latter in stages 18 – 24). The contents of the M register and of the program counter are not relevant. The N register is illustrated as storing the memory address (25700), which is the memory address of the next S program instruction to be executed. The Z register stores the JIN instruction word and the op-code register 30 stores JIN, N, i.e., the JIN operation code and the index bits identifying the N register.

Figure 2:
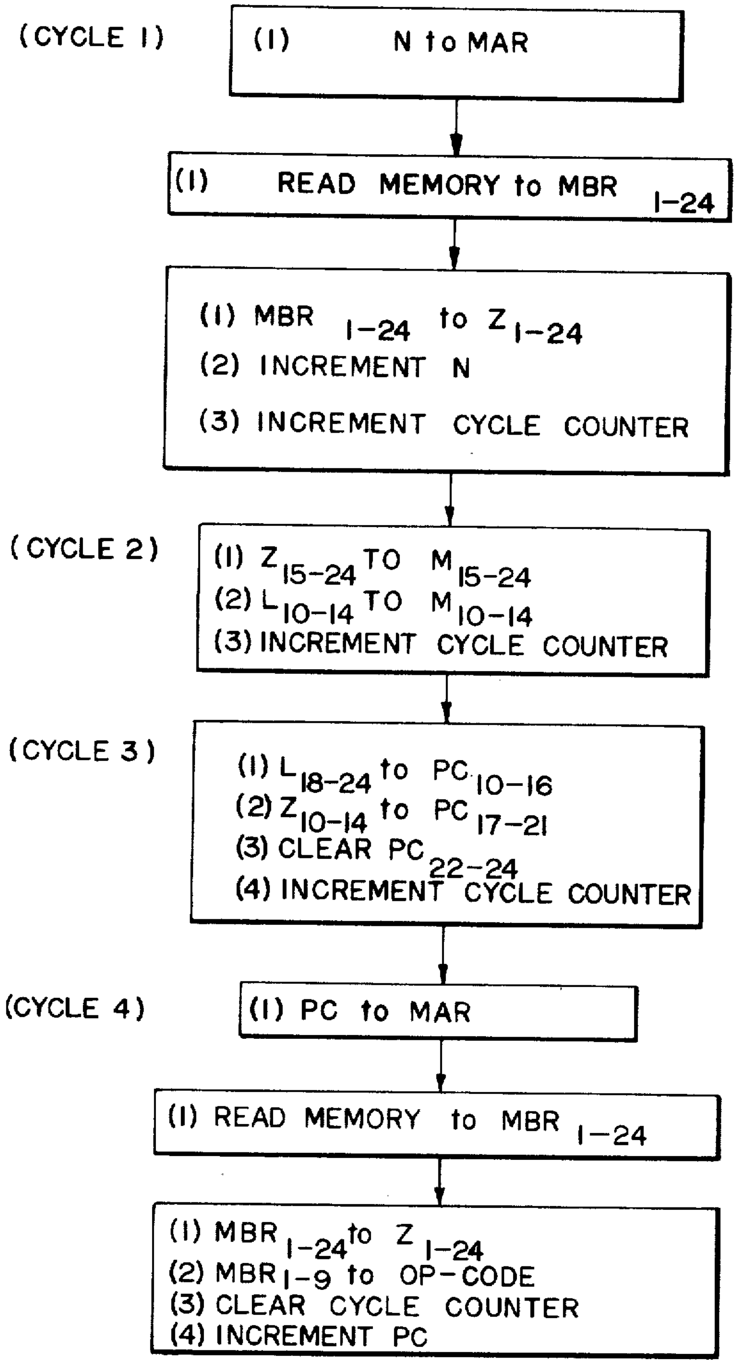
FIG. 2 is a flow chart illustrating an operating sequence of the computer of FIG. 1 for simulating another computer in accordance with the invention.

The decoding and gating unit 36 decodes the information in the op-code register. (See FIG. 41*a* and column 76 lines 35–50 in the above reference Schrimpf patent.) In response to this information and to timing pulses from the clock 38, it initiates a sequence of operations to perform the JIN instruction. FIG. 2 lists these operations as comprising four initial cycles, which will now be described.

The unit 36 first, in cycle 1, causes the computer to perform a fetch operation from the memory address specified by the contents of the N register 46. This transfers an instruction (referred to also as an S word) of the S program to the Z register. Specifically, in response to the JIN operation code and the index bits designating the N register, the decoding and gating unit 36 responds to a first timing pulse to produce control signals that operate gate circuits to transfer the contents of the N register to the transfer bus 34 and from that bus to the memory address register (MAR) in the memory unit 12. (Where desired, the N register contents may be modified before being transferred to the memory address register.)

In response to a subsequent timing pulse, the decoding and gating unit operates the memory unit 12 to read the word at the address now in the memory address register into the memory buffer register (MBR).

Next, the unit 36 processes a further clock pulse to store in the Z register the word just read into the memory buffer register. The op-code register 30 is not disturbed. Further, the unit increments both the N register and a cycle counter 36A, within the unit. This counter was previously cleared, which enables the decoding and gating unit to perform the cycle 1 operations when the op-code register receives a JIN code.

For the purpose of the present example, assume the S word read from the memory and now in the Z register is an (LdAc 100) instruction. This instruction, in the language of the S computer, cannot be performed directly with the FIG. 1 computer. Its operation code LdAc defined by the high order five bits of the word and now in the Z register stages 10 – 14, call for the S computer to load its accumulator register. The address field of this S word, formed by the ten low order bits, specify that the word to be loaded into the S computer accumulator is in memory location (100) of the S computer.

The decoding and gating unit has now finished a first cycle of operation set forth in FIG. 2 and the FIG. 1 computer has fetched the S word it is to simulatively interpret. The pertinent contents of the central processor unit registers and program counter are now as listed in FIG. 3B.

Still under control of the JIN operation code in the op-code register 30, and with the cycle counter incremented by one unit, the decoding and gating unit operates gating circuits that load the M register 44 with the address of the operand for the LdAc instruction just fetched. Specifically, in response to a further timing pulse, the unit 36 produces control signals that transfer the binary digits in the Z register stages 15 – 24 to stages 15 – 24 of the M register, the transfer being by way of the transfer bus 34. Other control signals from the unit 36 operate gate circuits that transfer the binary digits in the L register stages 10 – 14 to the same-numbered stages of the M register, also by way of the transfer bus. The cycle counter is again incremented to advance the decoding and gating unit 36 to the third cycle of FIG. 2.

The information thus transferred to the M register from the L register is the memory sector address (30) in the present example, where the S program operand for the LdAc instruction is stored. The information the M register receives from the address field of the S word in the Z register is the address, illustrated as (100), within this memory sector of the specified operand.

Accordingly, as indicated in FIG. 3C showing the central processor unit status at this point, the M register now has the address at which the S program operand for the S program instruction in the Z register is stored in the memory unit of the FIG. 1 computer.

In order to interpret the S word operation code LdAc in the Z register, the decoding and gating unit next loads the program counter 20 with the starting address of an interpretive subroutine for performing this operation with the FIG. 1 computer. As indicated in FIG. 2, this is done in a third cycle with control signals that:

1. load the program counter stages 10 – 16 with the sector address in stages 18 – 24 of the L register 42;

2. load the program counter stages 17 – 21 with the operation code bits in the Z register stages 10 – 14; and 3. clear, i.e. set to zero the program counter low order stages 22 through 24.

Assuming the LdAc operation code bits specify the decimal digits (10), the program counter now stores the address (20080), as listed in FIG. 3D. Also in cycle 3, the decoding and gating unit 36 increments the cycle counter.

The decoding and gating unit of the central processor unit 10 next fetches the subroutine instruction now addressed by the program counter and transfers it to the Z register in place of the S word (LdAc 100), with which the computer is now finished. Specifically, in response to a first timing pulse received after its cycle counter has been incremented to cycle four, the unit 36 transfers the address in the program counter to the memory address register. The unit 36 responds to a subsequent timing pulse to execute a read operation in which the instruction word thus addressed is read into the memory buffer register. This instruction is in the program for the FIG. 1 computer and hence is a 24-bit word.

As shown in FIG. 2, further operations in this fourth cycle are to transfer the instruction word from the memory buffer register to the Z register. The operation code and index bits of this instruction are also loaded into the op-code register 30, which is the normal operation for the illustrated central processor unit 10. This first instruction of the interpretive subroutine is illustrated as an (LDA, M) instruction, which means that the FIG. 1 computer is to load its A register 22 with the operand whose address is in the M register 44. This instruction, being in the language of the FIG. 1 computer, will be executed in a conventional manner, as are all the interpretive subroutine instructions.

The decoding and gating unit also increments the program counter 20 to the address of the next subroutine instruction for interpreting the LdAc instruction of the S program. This increment changes the least significant bit of the program counter word, which was set to a binary ZERO in cycle 3 to a binary ONE. By thus initially providing three binary ZEROS in the three least significant places of the program counter in cycle 2, the program counter can be incremented to address successively seven instructions in a given interpretive subroutine.

Finally, the cycle counter 36A is cleared at this time. This completes the four-cycle sequence shown in FIG. 2. With the cycle counter cleared, when the computer next reads a JIN instruction, it will initiate this sequence anew.

As shown in FIG. 3E, at this juncture, the L register 42 continues to store the addresses of the memory sectors containing S operands and interpretive subroutines. The M register contains the address loaded therein in cycle 2. Further, the N register continues to store the memory address of the next S program instruction to be executed. Note, however, that the program counter now contains the incremented address (20081), the Z register contains the (LDA, M) instruction, and the op-code register contains the operation code and index bits of the instruction.

After executing the (LDA, M) instruction, the computer of FIG. 1 fetches and executes successive instructions in the interpretive subroutine that performs the operation specified by the S program instruction LdAc. This is done in a conventional manner, using the program counter to address each instruction. The last instruction of the subroutine, assumed to be the eighth one so that the program counter will specify address (20087), has the operation code JIN and its index bits specify the N register. FIG. 3F shows the central processor unit status when this instruction is fetched.

This JIN instruction causes the FIG. 1 computer to repeat the cycle 1 operation described above with reference to FIG. 2. That is, the decoding and control unit 36 causes the central processor unit to fetch the next instruction in the S program from the memory address (25701) as specified in the N register, which is then incremented to (25702). FIG. 3G shows the status of the central processor unit after this instruction, illustrated as an (Add 200) instruction, has been fetched. The computer next generates new addresses in the M register 44 and in the program counter 20 for this S word in the Z register in the same manner as described above for cycles 2 and 3 with the LdAc instruction.

The computer of FIG. 1 stops interpretive simulation of the S program when it comes to a Halt or like instruction at the end of an interpretive subroutine.

In this manner, the central processor unit of FIG. 1, having the decoding and gating unit 36 that causes the sequence of operations summarized in FIG. 2, executes the S program efficiently, requiring a minimal number of steps, and with relatively little special programming. Further, a relatively simple and low-cost decoding and gating unit provides this operation with a relatively straightforward central processor unit arrangement. In this central processor unit, the L, M and N registers are preferably index registers for use in the conventional address-modifying manner during the processing of other programs in the processor unit.

The decoding and gating unit 36 is readily constructed to provide the foregoing operation using conventional logic circuits similar to those disclosed in U.S. Pat. No. 3,201,762 by computer logic engineers equipped with conventional skills. It should be understood that the specific details of a decoding and gating unit for practicing the invention will depend upon many factors, including the specific configuration of the central processor unit 10 and the logic of the registers, counters, gating circuits, and all other elements thereof as well as the timing cycle of the clock 38.

In summary, the present invention provides a computer central processor unit that responds to an instruction calling for interpretive simulation of a program in the language of a different computer stored therein to operate the elements of the processor unit in a unique manner. First, the instruction to be interpreted is read from a memory location specified by a processor unit register that the initiating instruction identifies. This register is then incremented to store the address of the next instruction to be interpreted.

The address field of the instruction just read from memory is combined with memory sector information stored in a second register and the result is placed in a third register. This result is the entire memory address of the operand referred to by the instruction to be interpreted.

The operation code of the instruction to be interpreted is combined with further memory sector information to produce a unique memory address for each different operation code. This address is placed in the program counter of the processor unit and is used by the computer to read its next instruction from memory. This is the first instruction of a subroutine with which the processor unit performs the same effective operation as the computer being simulated when that computer encounters the instruction being interpreted.

With this arrangement and operation, a central processor unit constructed in the foregoing manner simulatively interprets programs written for an entirely different computer in a direct and rapid fashion.

Moreover, the interpretation is executed without the dilation in program size produced by conventional software translation and without the dilation in execution time that accompanies prior software interpretation techniques.

Having thus described the invention, what is claimed as new and secured by Letters Patent is:

1. A method of simulating in real time the operation of a general purpose source computer on another general purpose computer including a first, second, third, fourth and fifth register means operable to receive and temporarily store information and to transfer information with respect to each other and to other elements of the processor unit and including op-code register means comprising the steps of:

a. storing in an allocated section of computer memory source program (S) instructions;
b. storing in another section of computer memory source program (S) operands;
c. storing in still another section of computer memory interpretive subroutine instructions by which the (S) instructions are interpreted into the language of the modified computer;
d. storing in first temporary storage the sector address in computer memory of the interpretive subroutine instructions and the (S) program operands;
e. storing in second temporary storage the starting address of (S) program instructions;
f. fetching from computer memory a source program (S) instruction having (S) op-code and index bits and temporarily storing it in third temporary storage;
g. forming, in fourth temporary storage, the address of source (S) program operands by,
   1. transferring from first temporary storage into fourth temporary storage the sector address of source program (S) operands, and also
   2. transferring from third temporary storage into fourth temporary storage the index bits of the source program (S) instruction;
h. forming in fifth temporary storage the address of an interpretive subroutine instruction by,
   1. transferring from first temporary storage into fifth temporary storage the sector address of the interpretive subroutine instructions, and also
   2. transferring from third temporary storage into fifth temporary storage the op-code bits of the source program (S) instruction;
i. and fetching from computer memory the subroutine instruction having subroutine op-code and index bits and storing it in third temporary storage in place of the source program (S) instruction.

2. The method of claim 1 including the step of storing in computer memory a jump interpretive (JIN) instruction having JIN op-code and index bits.

3. The method of claim 1 wherein simulative interpretation of the source computer is commenced by further steps comprising fetching a JIN instruction from computer memory and loading the JIN op-code into the op-code register means.

4. The method of claim 3 including the further step of transferring from third storage means into op-code means the op-code and index bits of the interpretive subroutine instruction in place of the JIN op-code.

5. The method of claim 4 including the further steps of fetching and executing successive interpretive subroutine instructions by, a. incrementing the interpretive subroutine instruction address formed in fifth temporary storage means after the execution of each subroutine instruction.

6. The method of claim 5 wherein the termination of fetching and executing one group of successive interpretive sub-routine instructions and commencing the fetching and executing of another group of interpretive sub-routines is signalled by the further step comprising moving a jump interpretive (JIN) instruction into third temporary storage addressed by an incremented address in fifth storage means.

* * * * *